United States Patent Office 2,772,292
Patented Nov. 27, 1956

2,772,292

HYDROGENATION OF MALEIC ANHYDRIDE

Herbert F. McShane, Jr., Wilmington, Del., and Robert B. Ramsey, Jr., Penns Grove, N. J., assignors to E. I. du Pont de Nemours & Company, Wilmington, Del., a corporation of Delaware No Drawing. Application July 13, 1953,
Serial No. 367,746

5 Claims. (Cl. 260—343.6)

This invention relates to a new and improved process for the direct catalytic hydrogenation of maleic anhydride to tetrahydrofuran, tetramethylene glycol, and gamma-butyrolactone. More specifically, this invention has as its object the direct one-step production of the aforementioned hydrogenation products, preferably tetrahydrofuran, from maleic anhydride.

Such one-step production of these substances may be accomplished by reacting maleic anhydride with hydrogen at an elevated temperature and pressure in the presence of a pyrophoric, foraminous, metal skeleton of the group consisting of nickel and cobalt skeletons remaining after the extraction of an alloying ingredient from an alloy thereof.

In accordance with one embodiment of this invention, a pressure reactor is charged with the anhydride, catalyst and, if desired, a solvent. The reactor is cooled and evacuated. Hydrogen is then injected to a pressure in excess of 500 p. s. i. ("p. s. i." as used throughout the specification and claims means pounds per square inch gauge pressure), and the charge heated to a temperature of at least 175° C. At intervals, as necessary, hydrogen is injected to maintain the pressure within the reactor at the level selected for the reaction. After reaction is completed, as evidenced by cessation of pressure drop, the reaction mixture is permitted to cool, the reactor is opened and the contents discharged and filtered. The filtrate is then processed by methods well known to those skilled in the art, e. g., fractional distillation, to isolate the products of reaction.

The following examples illustrate the invention by several specific embodiments. The specific details of these examples are not to be taken as limitations upon the invention.

*Example I*

In a 400 ml., silver-lined, hydrogenation vessel capable of withstanding the pressures employed and connected to a shaker device was placed 100 grams of maleic anhydride and 10 grams of a cobalt catalyst prepared according to Example I of U. S. Patent No. 2,166,183. The air was swept out by a stream of nitrogen. The shaker was started, then vessel and contents were heated to 65° C., pressured to 1500 p. s. i. hydrogen pressure, and then heated to 190° C. At 190° C. the pressure of hydrogen was increased to 12,000 p. s. i., and then the temperature was raised to 275° C. while the pressure was maintained between 11,000 p. s. i. and 12,000 p. s. i. The vessel was maintained at 275° C. and 11,000 p. s. i. to 12,000 p. s. i. for three and one-half hours.

After cooling and venting the bomb, the product was transferred to a distillation pot which was fitted with a distilling head and Dry Ice (solid carbon dioxide) cooled receiver. The organic products were separated from the catalyst by vacuum flash distillation conducted in two steps. The first step at 50 mm. absolute pressure removed the lower boilers and substances boiling up to 100° C. at 50 mm., and the second step at 5 mm. removed the higher boiling compounds with a minimum of decomposition.

An alternative work-up procedure was used at this stage. The catalyst and higher boiling organics were separated from each other by vacuum filtration and water washing of the catalyst. The filtrate and washes were combined and the water removed during subsequent fractionation.

The low boilers and the high boilers obtained by either of the above separation methods were combined and fractionated through a thirty-plate column.

Fractionation yielded:

| Cut No. | Weight (Grams) | B. P., ° C. (mm.) | Conversion (Percent) | Compound | Remarks |
|---|---|---|---|---|---|
| 1 | 8.7 | 60–68° | 11 | Tetrahydrofuran azeotrope. | 96% Tetrahydrofuran, 4% water. |
| 2 | 5.0 | Circa 88° | 6 | Propanol azeotrope. | Propanol azeotrope with water. |
| 3 | 6.0 | Circa 92° | 4 | Butanol azeotrope. | Approx. 3 grams $C_4H_9OH$. |
| 4 | 18.3 | 97–100° | | Water | |
| 5 | 0.6 | 100–200° | | | |
| 6 | 1.6 | 120–136° (48) | } 64 | Tetramethylene glycol. | $n_D^{25}=1.4440$. |
| 7 | 57.9 | 145–155° (48) | | | |
| 8 | 4.0 | High boilers | | | |

The tetramethylene glycol and tetrahydrofuran were redistilled and found to boil at 154° C. (47 mm.) and 64° C. to 65° C., respectively. The refractive index of the pure tetramethylene glycol was found to be the same as that given for Cut No. 7, while that of the tetrahydrofuran azeotrope was $n_D^{25}=1.4054$.

*Example II*

By the procedure of Example I, 100 grams of maleic anhydride was hydrogenated at 250° C. and at 2000 p. s. i. $H_2$ pressure over 20 grams of the alloy skeleton of cobalt obtained by dissolving aluminum from micropulverized aluminum-cobalt alloy with 50% aqueous solution of NaOH; (such catalyst is sometimes referred to as Raney cobalt). This gave an 7% conversion to tetrahydrofuran and 74% conversion to butyrolactone.

*Example III*

Maleic anhydride was hydrogenated over Raney nickel by the general procedure of Example I, using different reaction conditions and amounts of catalyst as shown in the following table:

| Catalyst (wt. percent) | Temperature (° C.) | Time (hrs.) | H₂ Pressure (p. s. i.) | Products (Percent Conversion) | | | |
|---|---|---|---|---|---|---|---|
| | | | | THF [a] | TMG [b] | B. L. [c] | S. A. [d] |
| 26 | 176–200 | 5 | 3,000 | 3 | 0 | 48 | 30 |
| 26 | 230 | 6 | 3,000 | 17 | 4 | 46 | 0 |
| 26 | 250 | 4.3 | 3,000 | 30 | 8 | 18 | 0 |
| 26 | 275 | 0.5 | 3,000 | 21 | 0 | 16 | 0 |
| | | | | large amt. degradation | | | |
| 10 | 250 | 3.8 | 7,000 | 13 | 0 | 62 | 0 |
| 10 | 250 | 4 | 12,000 | 23 | 12 | 44 | 0 |

[a] THF=tetrahydrofuran.
[b] TMG=tetramethylene glycol.
[c] B. L.=gamma-butyrolactone.
[d] S. A.=succinic anhydride.

A number of attempts were made to hydrogenate maleic anhydride to tetrahydrofuran, tetramethylene glycol, and gamma-butyrolactone by subjecting 100 grams of maleic anhydride to 3000 p. s. i. hydrogen pressure at a temperature of about 250° C. in the presence of 10 grams of hydrogenation catalysts including three different commercial nickel catalysts, reduced nickel oxide, ruthenium on silicon carbide, and copper chromite. Very low conversions to butyrolactone and no conversion to tetrahydrofuran or tetramethylene glycol were obtained by the use of such nickel and ruthenium hydrogenation catalysts. With copper chromite no detectable conversions to the above three products were obtained.

The process of the present invention can be carried out either batchwise or in a continuous manner, with or without a solvent. Any reasonably pure grade of maleic anhydride is operable, the only precaution being necessary is to avoid poisoning of the catalyst. It is well known that materials such as halogens and many of their compounds, as well as many nitrogen- and sulfur-containing compounds, are harmful to the activity of the nickel and cobalt catalysts. Such materials are, therefore, preferably avoided in carrying out the present invention.

The present invention may generally be carried out at a temperature between 175° C. and 300° C. and between 500 to 12,000 p. s. i. pressure. The preferred conditions for use with a nickel catalyst include a temperature of about 230° C. to 260° C. and a pressure of about 5000 to 12,000 p. s. i. The preferred conditions with a cobalt catalyst comprise a temperature of about 230° C. to 280° C. and a pressure of about 8000 to 12,000 p. s. i. These conditions apply both for the production of tetrahydrofuran and tetramethylene glycol. Lower pressures, for example pressures of 1500 to 3000 p. s. i., are conducive to the production of gamma-butyrolactone.

The operable catalysts are the highly-active, pyrophoric forms of nickel and cobalt generally made from their alloys with aluminum. Similar catalysts may also be prepared by extraction of other inactive components from alloys of nickel and cobalt with silicon, magnesium and zinc. The name "alloy skeleton" is often used to describe the physical structure of such catalysts. The extraction of inactive ingredients from nickel and cobalt alloys can be carried out by several known methods. When caustic alkali is used, the resulting materials are often referred to as Raney catalysts. Usually aluminum alloys are used for this purpose. Preparation of Raney nickel is described in U. S. Patent No. 1,628,190 and in the reference "Reactions of Hydrogen" by Homer Adkins, University of Wisconsin Press, 1937. A method for the preparation of the corresponding cobalt catalyst is described in U. S. Patent No. 2,166,183. For the preparation of the cobalt catalyst, the cobalt alloy before dissolving the alloying ingredient therefrom is preferably pulverized to a particle size finer than 200 mesh to obtain a high activity of the final catalyst. Such pulverization may be done with a so-called micro-pulverizer or with any other means for the production of a finely-divided product. See "Newer Methods of Preparative Organic Chemistry", Interscience Publishers, Inc., New York, 1948, pp. 61–70.

The catalyst may be used as pellets or as finely-divided powders. When using a continuous flow process, it is preferred that the catalyst be in the form of pellets and thereby minimize mechanical losses and avoid excessive resistance to fluid flow. In batch operation, it is best that the catalyst be in finely-divided form in order to obtain therefrom the maximum activity.

Throughout the specification and claims any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

We claim:

1. The process for the production of tetrahydrofuran, tetramethylene glycol, and gamma-butyrolactone which comprises reacting maleic anhydride with hydrogen at a temperature between 175° C. and 300° C. and a pressure between 500 p. s. i. and 12,000 p. s. i. in the presence of a pyrophoric foraminous metal skeleton of the group consisting of nickel and cobalt skeletons remaining after the extraction of an alloying ingredient from an alloy thereof.

2. The process for the production of tetrahydrofuran, tetramethylene glycol, and gamma-butyrolactone which comprises reacting maleic anhydride with hydrogen at a temperature between 190° C. and 280° C. and a pressure between 5000 p. s. i. and 12,000 p. s. i. in the presence of a pyrophoric foraminous metal skeleton of the group consisting of nickel and cobalt skeletons remaining after the extraction of an alloying ingredient from an alloy thereof.

3. The process for the production of tetrahydrofuran, tetramethylene glycol, and gamma-butyrolactone which comprises reacting maleic anhydride with hydrogen at a temperature between 190° C. and 280° C. and a pressure between 5000 p. s. i. and 12,000 p. s. i. in the presence of a pyrophoric foraminous nickel skeleton remaining after the extraction of an alloying ingredient from an alloy thereof.

4. The process for the production of tetrahydrofuran, tetramethylene glycol, and gamma-butyrolactone which comprises reacting maleic anhydride with hydrogen at a temperature between 190° C. and 280° C. and a pressure between 5000 p. s. i. and 12,000 p. s. i. in the presence of a pyrophoric foraminous cobalt skeleton remaining after the extraction of an alloying ingredient from an alloy thereof.

5. The process for the production of gamma-butyrolactone which comprises reacting maleic anhydride with hydrogen at a temperature between 190° C. and 280° C. and a pressure between 1500 and 3000 p. s. i. in the presence of a pyrophoric foraminous metal skeleton of the group consisting of nickel and cobalt skeletons remaining after the extraction of an alloying ingredient from an alloy thereof.

References Cited in the file of this patent

UNITED STATES PATENTS

| 2,072,861 | Amend et al. | Mar. 9, 1937 |
| 2,130,501 | Lazier | Sept. 20, 1938 |
| 2,257,800 | Howk | Oct. 7, 1941 |

FOREIGN PATENTS

| 570,843 | Great Britain | July 25, 1945 |
| 611,987 | Great Britain | Nov. 5, 1948 |